P. L. SHERMAN.
Wire Fence.
No. 107,297. Patented Sept. 13, 1870.
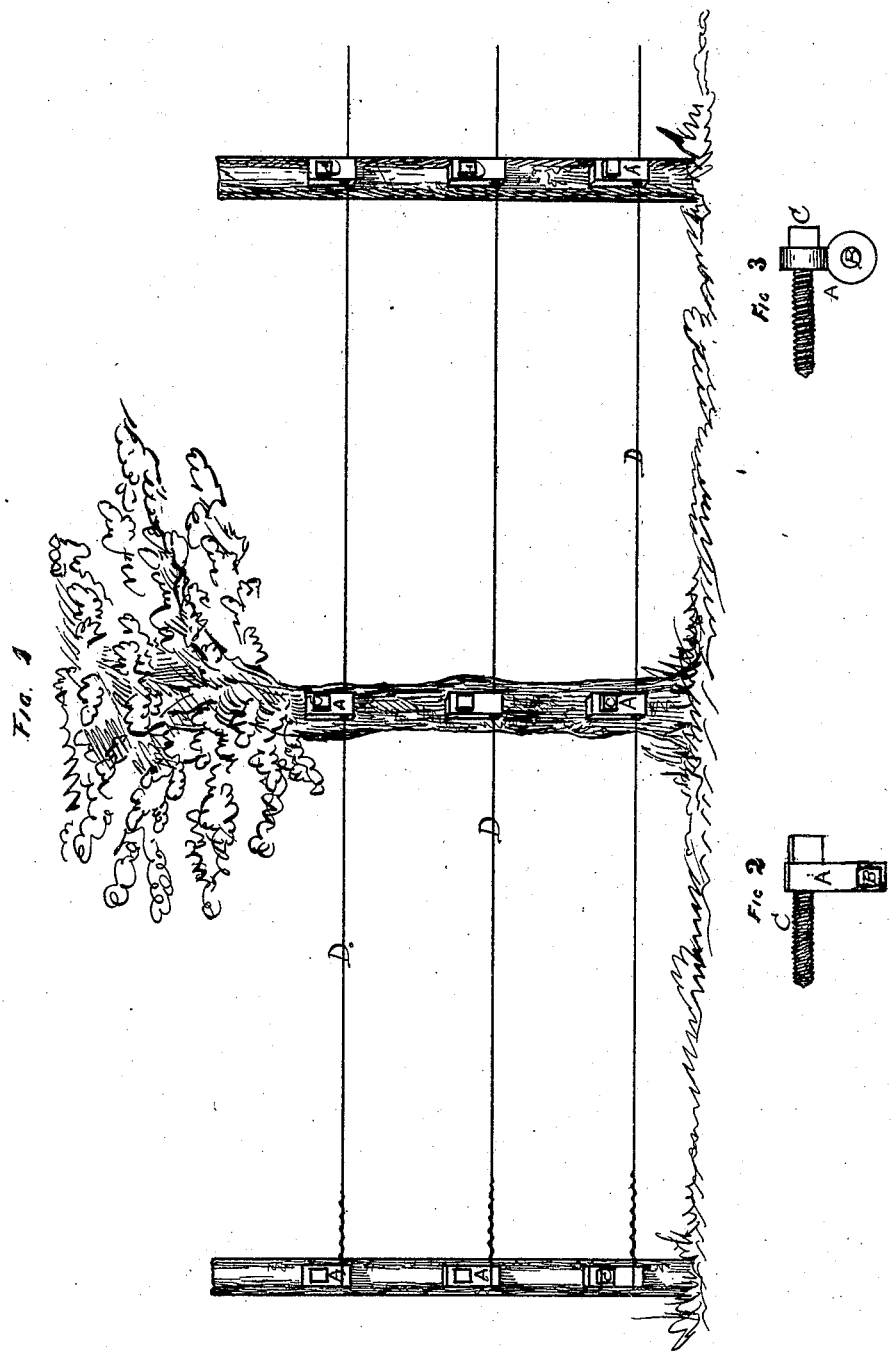

United States Patent Office.

PHINEAS L. SHERMAN, OF GENESEO TOWNSHIP, IOWA.

Letters Patent No. 107,297, dated September 13, 1870.

IMPROVEMENT IN FENCES.

The Schedule referred to in these Letters Patent and making part of the same.

To all whom it may concern:

Be it known that I, PHINEAS L. SHERMAN, of Geneseo township, in the county of Tama and State of Iowa, have invented a new and useful Improvement in Fences; and I do hereby declare the following to be a full, clear, and exact description thereof, which will enable others skilled in the art to which my invention appertains to make and use the same, reference being had to the accompanying drawing forming part of this specification.

Figure 1 is a view of my improved fence, formed upon a tree and two upright posts.

Figures 2 and 3 are detached views of the double sockets and screws, by which the wire or other fencing is secured to posts or trees.

Similar letters of reference indicate corresponding parts in the several figures of the drawing.

My invention has for its object to provide an improved fence; and, to this end,

It consists in the provision of double sockets or loops, formed each of a short metallic bar, provided with two holes at right angles to each other, one for the passage of the fence-wires or rails, and the other to receive a screw or nail, by which the sockets are secured to a tree or post, as will be hereinafter more fully described.

In the accompanying drawing—

A is a short metallic bar, provided with two holes, B, arranged at right angles to each other.

The sockets are secured to posts or trees, two or more being arranged upon a post or tree, one above the other, by means of nails or screws, C, so that the lower holes shall receive the fence-wires D, as shown in fig. 1.

When wires are not employed for fencing, the lower hole of the sockets is made square, to receive the end of a board or fence-rail, as shown in fig. 2.

By my invention fences may be formed by using trees for posts, without injury to the trees. Lighter posts may also be used, inasmuch as the nails or screws C do not weaken them.

Having thus described my invention,

What I claim as new, and desire to secure by Letters Patent, is—

In the construction of fences, the double sockets A, secured to posts or trees by the screws or nails C, and adapted to receive the fencing-wires or rails, in the manner described, for the purpose specified.

PHINEAS L. SHERMAN.

Witnesses:
E. A. ELLSWORTH,
N. K. ELLSWORTH.